(12) United States Patent
Subramanian et al.

(10) Patent No.: US 7,586,990 B2
(45) Date of Patent: Sep. 8, 2009

(54) METHOD AND SYSTEM FOR ALLOCATING SUBCARRIERS TO SUBSCRIBER DEVICES

(75) Inventors: Vijay G. Subramanian, Chicago, IL (US); Rajeev Agrawal, Northbrook, IL (US); Randall Berry, Chicago, IL (US); Jiawei Huang, Princeton, NJ (US)

(73) Assignees: Motorola, Inc., Schaumburg, IL (US); Northwestern University, Evanston, IL (US)

( * ) Notice: Subject to any disclaimer, the term of this patent is extended or adjusted under 35 U.S.C. 154(b) by 634 days.

(21) Appl. No.: 11/286,944

(22) Filed: Nov. 22, 2005

(65) Prior Publication Data

US 2007/0116139 A1    May 24, 2007

(51) Int. Cl.
*H04K 1/10* (2006.01)
*H04L 27/00* (2006.01)

(52) U.S. Cl. ........................... 375/260; 375/316
(58) Field of Classification Search ............. 375/260, 375/316
See application file for complete search history.

(56) References Cited

U.S. PATENT DOCUMENTS

| | | | |
|---|---|---|---|
| 6,335,922 B1* | 1/2002 | Tiedemann et al. | 370/335 |
| 6,493,331 B1* | 12/2002 | Walton et al. | 370/341 |
| 6,597,705 B1 | 7/2003 | Rezaiifar et al. | |
| 2002/0061007 A1* | 5/2002 | Pankaj | 370/342 |
| 2003/0072297 A1 | 4/2003 | Oses et al. | |
| 2003/0072379 A1 | 4/2003 | Ketchum | |
| 2003/0081627 A1 | 5/2003 | Bao et al. | |
| 2003/0081692 A1 | 5/2003 | Kwan et al. | |
| 2003/0128658 A1* | 7/2003 | Walton et al. | 370/208 |
| 2003/0128665 A1 | 7/2003 | Bernhard et al. | |
| 2003/0169681 A1* | 9/2003 | Li et al. | 370/203 |
| 2003/0227889 A1 | 12/2003 | Wu et al. | |
| 2004/0006504 A1* | 1/2004 | Mariamova et al. | 705/10 |
| 2004/0142714 A1* | 7/2004 | Viswanath et al. | 455/517 |
| 2004/0171359 A1 | 9/2004 | Tirkkonen et al. | |
| 2004/0192318 A1 | 9/2004 | Fisher | |
| 2004/0209579 A1* | 10/2004 | Vaidyanathan | 455/101 |
| 2005/0002357 A1 | 1/2005 | Hu et al. | |

(Continued)

OTHER PUBLICATIONS

Agrawal, Rajeev et al.: "Optimality of Certain Channel Aware Scheduling Policies", Mathematics of Communications Networks, Motorola, Inc, Arlington Heights, Illinois, 2002, all pages.

(Continued)

*Primary Examiner*—Mohammad H Ghayour
*Assistant Examiner*—Sarah Hassan

(57) ABSTRACT

A method and system for allocating a plurality of subcarriers to a plurality of subscriber devices in a wireless network. A set of characteristics is identified (302) for a transmission on each of the plurality of subcarriers. A dynamic weight is assigned (304) to at least one subscriber device of the plurality of subscriber devices at each decision instance of the transmission corresponding to the at least subscriber device. The assignment of the dynamic weight is based on at least one of a throughput, delay, packet-loss and queue length requirement of one or more flows of the subscriber device. Further, a set of optimum values is determined (306) for the set of characteristics based on the dynamic weights and channel feedback. The plurality of subcarriers are allocated (308) to the at least one subscriber device based on at least one optimum value of the set of optimum values.

19 Claims, 4 Drawing Sheets

U.S. PATENT DOCUMENTS

2006/0002360 A1* 1/2006 Ji et al. .................. 370/343
2007/0026803 A1 2/2007 Malm

OTHER PUBLICATIONS

Han, Clemence S.: USA Office Action Summary, Sep. 12, 2007.
Anolick, Simon B.: Response to USA Office Action Summary, Feb. 7, 2008.
Han, Clemence S.: USA Office Action Summary, May 30, 2008.
Anolick, Simon B.: Response to USA Office Action Summary, Oct. 30, 2008.
Yu, Wei et al.: FDMA Capacity of Gaussian Multiple-Access Channels with ISI, IEEE Transactions on Communications, vol. 50, No. 1, Jan. 2002, pp. 102-111.
Hoo, Louise M.C. et al.: Multiuser Transmit Optimization for Multicarrier Broadcast Channels: Asymptotic FDMA Capacity Region and Algorithms, IEEE Transactions on Communications, vol. 52, No. 6, Jun. 2004, pp. 922-930.

* cited by examiner

METHOD AND SYSTEM FOR ALLOCATING SUBCARRIERS TO SUBSCRIBER DEVICES

REFERENCE TO RELATED APPLICATION

This application is related to a co-pending application, Ser. No. 10/983,499, entitled "METHOD AND APPARATUS FOR RESOURCE ALLOCATION AND SCHEDULING," filed Nov. 08, 2004, which is assigned to the assignee of the present application.

FIELD OF THE INVENTION

The present invention relates to the field of multi-carrier systems in wireless networks, and more specifically, to the allocation of subcarriers to subscriber devices of the wireless network.

BACKGROUND OF THE INVENTION

In a wireless network, for example, a cellular network, data is transmitted from a Base Station (BS) to a subscriber device or vice versa. A multi-carrier system of the wireless network employs multiple subcarriers in each carrier channel of the network. Examples of multi-carrier systems include, but are not limited to, Orthogonal Frequency Division Multiplexed (OFDM) systems, Orthogonal Frequency Division Multiple Access (OFDMA) systems, and the like.

Subcarriers are allocated to subscriber devices for data transmission. Several methods are available for allocating subcarriers to subscriber devices. One of the known methods employs OFDMA for subcarrier allocation or selection. The method includes partitioning subcarriers into groups of clusters of subcarriers. When an indication of a selection by the subscriber of one or more groups is received, clusters in the groups are allocated, for use in the communication with the subscriber.

However, there are several design/engineering problems associated with the allocation of subcarriers to subscriber devices. This is because the data to be transmitted or received has certain Quality of Service (QoS) requirements, such as delay and throughput requirements. For example, voice data may have a small throughput requirement but stringent delay requirements. Further, data such as streaming video, Internet downloads, and file transfers have requirements that can vary at every instance of the transmission. Further, the base station (BS) and the subscriber device may have constraints such as transmit and receive power constraints. Moreover, carrier channel conditions may vary both across sub-carriers and subscriber devices. Therefore, it is difficult to satisfy the QoS requirements, given the carrier channel conditions and constraints.

BRIEF DESCRIPTION OF THE DRAWINGS

Various embodiments will hereinafter be described in conjunction with the appended drawings provided to illustrate and not to limit the invention, wherein like designations denote like elements, and in which.

Figure 1:
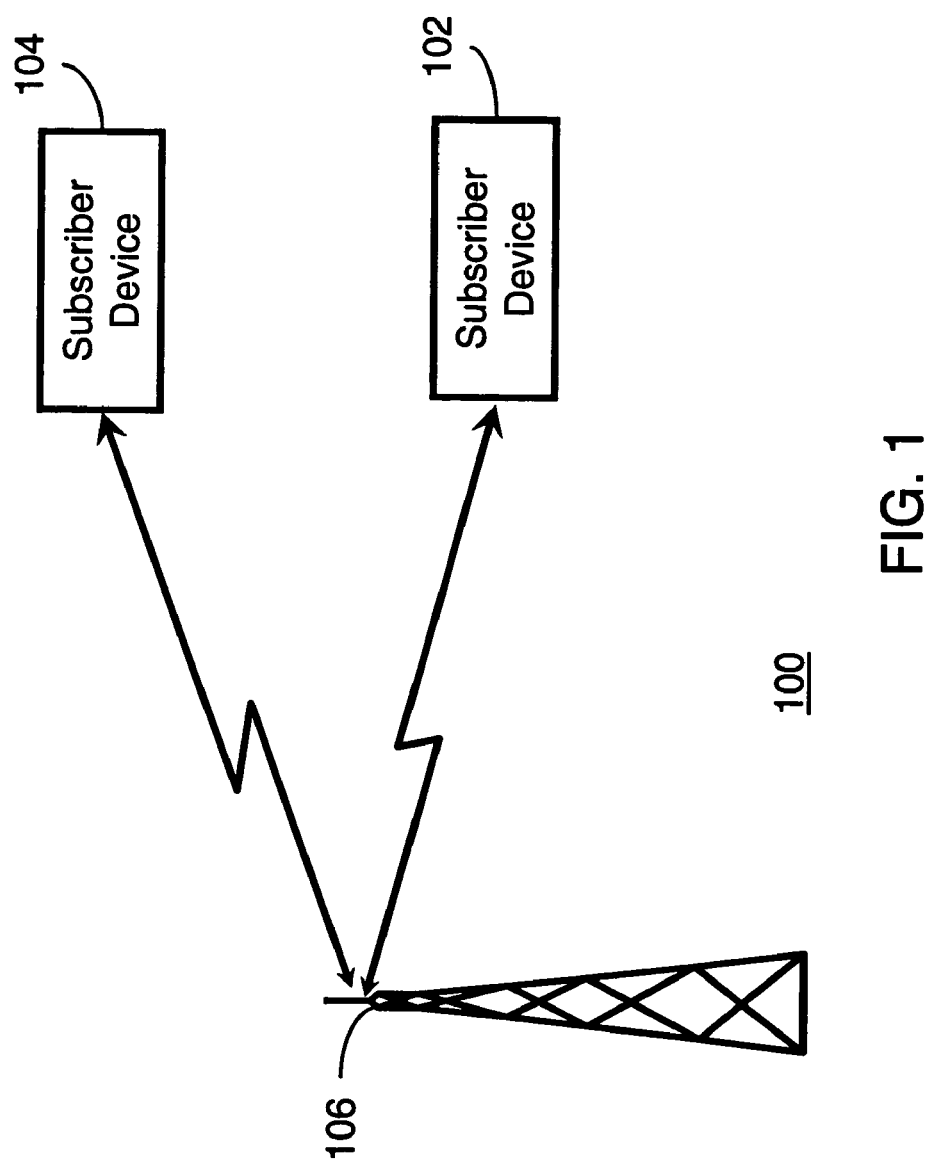
FIG. 1 shows a wireless network in which various embodiments of the present invention can be practiced.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE EMBODIMENTS

Before describing in detail the method for allocating the plurality of subcarriers to the plurality of subscriber devices in the wireless network, it should be observed that the present invention resides primarily in the method steps and system components, which are employed to achieve the allocation of the plurality of subcarriers to the plurality of subscriber devices.

Accordingly, the method steps and system components have been represented where appropriate by conventional symbols in the drawings, showing only those specific details that are pertinent to understanding the present invention, so as not to obscure the disclosure with details that will readily be apparent to those of ordinary skill in the art having the benefit of the description herein.

In this document, relational terms such as first and second, and so forth may be used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "... a" does not, without more constraints, preclude the existence of additional identical elements in the process, method, article, or apparatus that the element.

The term 'another', as used herein, is defined as at least a second or more. The terms 'including' and/or 'having', as used herein, are defined as comprising.

The present invention provides a method for allocating a plurality of subcarriers to a plurality of subscriber devices in a wireless network. The method includes identifying a set of characteristics for a transmission on each subcarrier of the plurality of subcarriers, and assigning a dynamic weight to at least one subscriber device of the plurality of subscriber devices. The dynamic weight is assigned at each decision instance of the transmission corresponding to the at least one subscriber device based on at least one of a throughput, delay, packet-loss and queue length requirement of one or more flows of the at least one subscriber device. Further, the method includes determining a set of optimum values for the set of characteristics based on the dynamic weight and a channel feedback. The set of optimum values are determined under a set of constraints for each subcarrier of the plurality of subcarriers. Further, at least one subcarrier of the plurality of subcarriers is allocated to at least one subscriber device based on at least one optimum value of the set of optimum values.

The present invention also provides a method for optimizing subcarrier allocation for a plurality of subscriber devices in a wireless network. The method includes identifying a set of characteristics for transmissions on a plurality of subcarriers. The method also includes assigning a dynamic weight to one or more subscriber devices of the plurality of subscriber devices at each decision instance of a transmission corresponding to the one or more subscriber devices based on at least one of the throughput, delay, packet-loss and queue length requirements of one or more flows of one or more subscriber devices. The method further includes determining a set of optimum values of the set of characteristics for each subcarrier of the plurality of subcarriers based on the dynamic weight and a channel feedback. The set of optimum values are determined under a set of constraints for each subcarrier of the plurality of subcarriers. The subcarriers of the plurality of subcarriers are grouped into a set of bundles based on the set of optimum values for each subcarrier of the plurality of subcarriers. A bundle of the set of bundles is allocated to the one or more subscriber devices based on the set of optimum values for each subcarrier in the bundle.

The present invention further provides a system in a base station suitable for allocating a plurality of subcarriers to the plurality of subscriber devices in a wireless network. The system includes an identifier, an assignor, an optimizer and an allocator. The identifier is capable of identifying a set of characteristics for a transmission on each subcarrier of the plurality of subcarriers. The assignor assigns a dynamic weight to at least one subscriber device of the plurality of subscriber devices at each decision instance of the transmission corresponding to the at least one subscriber device based on at least one of the throughput, delay, packet-loss and queue length requirements of one or more flows of the at least one subscriber device. The optimizer is capable of determining a set of optimum values for the set of characteristics based on the dynamic weight and a channel feedback. The set of optimum values are determined under a set of constraints for each subcarrier of the plurality of subcarriers. Based on at least one optimum value of the set of optimum values, the allocator is capable of allocating at least one subcarrier of the plurality of subcarriers to at least one subscriber device.

Various embodiments of the present invention provide a method and system for allocating a plurality of subcarriers to a plurality of subscriber devices in a wireless network. Embodiments of the present invention described below pertain to wireless networks employing multi-carrier systems such as time division multiplexed and frequency division multiplexed systems. Examples of frequency division multiplexed systems include Orthogonal Frequency Division Multiplexed (OFDM) systems and Orthogonal Frequency Division Multiple Access (OFDMA) systems. However, the present invention is not limited to multi-carrier systems only.

FIG. 1 shows a wireless network 100 in which various embodiments of the present invention can be practiced. The wireless network 100 includes subscriber devices 102 and 104, and a Base Station (BS) 106. Examples of the subscriber devices 102 include, but are not limited to, a Code Division Multiple Access (CDMA) cellular telephone, a cellular modem, a Personal Digital Assistant (PDA) with a wireless interface, a laptop device with a wireless interface, Consumer Premises Equipment (CPE) with a wireless interface, and other mobile devices. The subscriber devices, for example, the subscriber devices 102 and 104, communicate with the BS 106 through a carrier channel of the wireless network 100.

Figure 2:
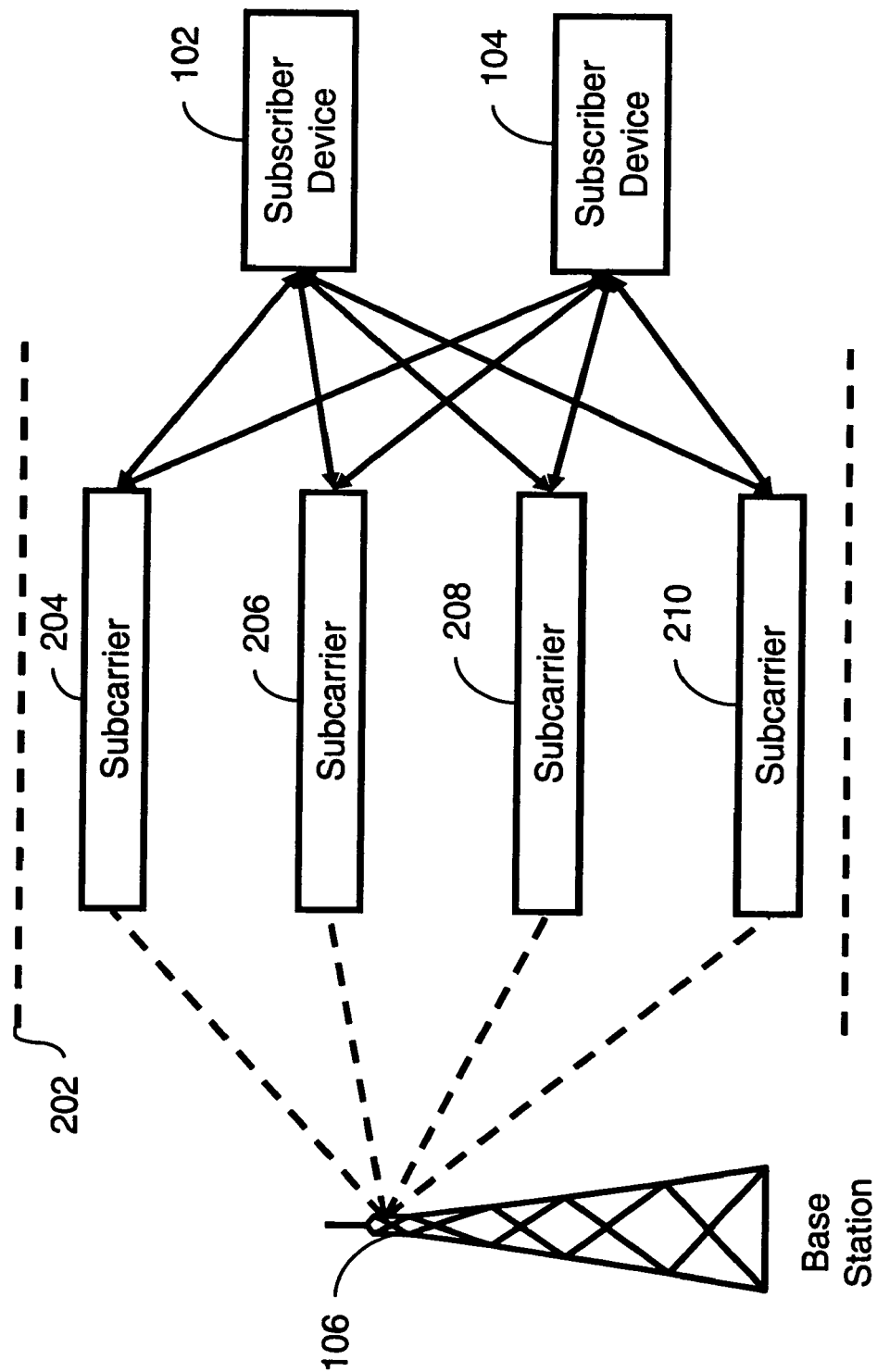
FIG. 2 shows a carrier channel between subscriber devices and a base station, in accordance with an embodiment of the present invention.

FIG. 2 shows a carrier channel 202 between the subscriber devices 102 and 104 and the BS 106, in accordance with an embodiment of the present invention. The carrier channel 202 includes multiple subcarriers, for example, subcarriers 204, 206, 208, and 210. The subscriber devices 102 and 104 communicate with the BS 106 through the carrier channel 202. For the purpose of the communication, the subcarriers of the carrier channel need to be allocated to the subscriber devices of the wireless network.

Figure 3:
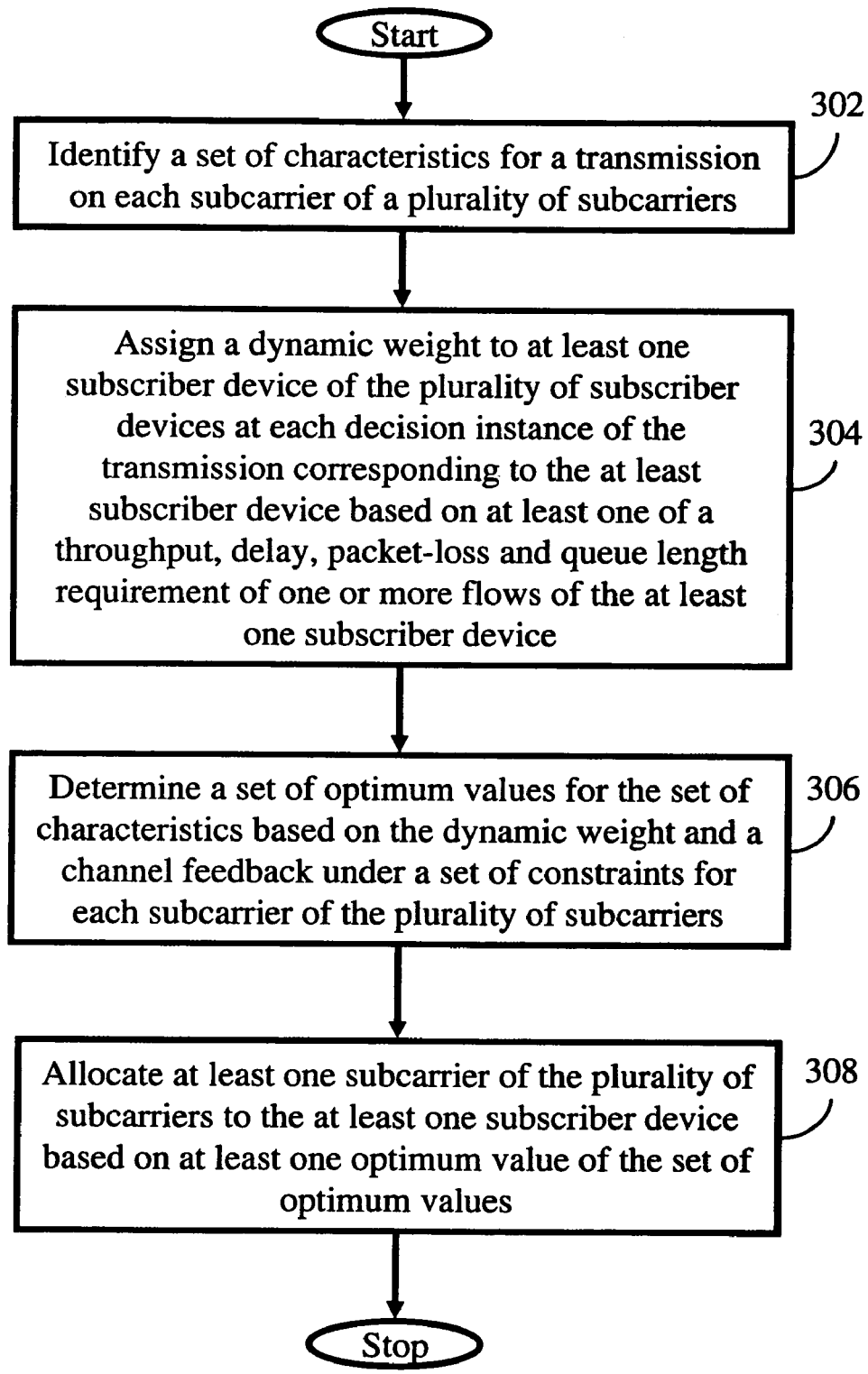
FIG. 3 is a flowchart depicting a method for allocating subcarriers to subscriber devices in a wireless network, in accordance with an embodiment of the present invention.

FIG. 3 is a flowchart depicting a method for allocating the subcarriers to the subscriber devices in the wireless network 100, in accordance with an embodiment of the present invention. At step 302, a set of characteristics is identified for a transmission on each subcarrier of the carrier channel. In an embodiment of the present invention, the transmission is directed from a subscriber device to the BS 106 or is an uplink transmission. In another embodiment of the present invention, the transmission is directed from the BS 106 to the subscriber device or is a downlink transmission. The set of characteristics are selected from a Modulation and Coding Scheme (MCS), data rate, and/or power of the transmission for each subcarrier of the carrier channel.

At step 304, a dynamic weight is assigned to the subscriber device, for example, the subscriber device 102 at each decision instance. The decision instance is also referred to as a scheduling instance or a frame of the transmission. The subscriber device has one or more flows to transmit at the decision instance. Different flows can have different Quality of Service (QoS) requirements. Multiple cases can be imagined: one, different dynamic weights for each flow (since QoS requirements are different) and a big joint optimization across users and flows; two, different dynamic weights for each flow (since QoS requirements are different) and a collective dynamic weight per user for optimization. The value of the dynamic weight is based on the QoS requirements of the flows of the subscriber device at each decision instance of the transmission. The QoS requirements may include a throughput, delay, packet-loss and/or queue-length requirement of the flows of the subscriber device.

At step 306, a set of optimum values for the set of characteristics is determined. The set of optimum values are determined based on the dynamic weight and a channel feedback. The channel feedback refers to a feedback that is provided to a transmitting subscriber device or a transmitting BS regarding a state of the carrier channel. The state of the carrier channel includes transmission conditions such as Signal to Noise-plus-Interference Ratio (SINR), Additive White Gaussian Noise (AWGN) in the carrier channel, a channel gain, and/or an equivalent rate that can be supported at the measured SINR. The channel feedback is used because values in the set of optimum values for the set of characteristics depend on the transmission conditions of the carrier channel.

Further, the set of optimum values are determined under a set of constraints for each subcarrier of the carrier channel. In an embodiment of the present invention, the set of constraints include uplink or downlink constraints, or a combination thereof. Examples of downlink constraints include, but are not limited to, base station transmit power, data available for each subscriber device, information pertaining to the transmission, such as whether it is a new transmission or a retransmission, the maximum number of subcarriers allowed per subscriber device, and the like. Examples of uplink constraints include, but are not limited to, subscriber device transmit power, the data available for each subscriber device, information pertaining to the transmission, such as whether it is a new transmission or a retransmission, and the maximum number of subcarriers allowed per subscriber device. The set of constraints may further include a set of subscriber device constraints. Examples of the subscriber device constraints include, but are not limited to, receiver capability constraints of the subscriber device in the downlink, and transmitter capability constraints of the subscriber device in the uplink. Examples of receiver capability constraints include a receiver's incapability to decode certain modulation schemes, reorder buffer size, and the like. Examples of transmitter capability constraints include a transmitter's incapability to transmit/encode certain modulation schemes, and other transmitter constraints.

The set of optimum values are determined by optimizing a rate vector. For the wireless network having, for example, N subscriber devices represented by $\{S_1, \ldots, S_i, \ldots, S_N\}$, the general form of the rate vector $V_t$ at a decision instance t is given by:

$$V_t = \underset{v \in R(\eta_t)}{\arg\max} \sum_i w_i v_i \quad (1)$$

where $\eta_t$ represents the collective (of all users) channel state at time t, $R(\eta_t)$ is the rate region at time t, $v_i$ is a rate for the subscriber device $S_i$, and $w_i$ is the dynamic weight assigned to $v_i$. Note that the data rate here is the total rate of transmission over all the sub-carriers allocated to a user since multiple sub-carriers can be assigned to a user.

The process of optimization will now be explained, for example, for an OFDMA downlink. For the OFDMA downlink, for which the carrier channel includes, for example, M subcarriers represented by $\{C_1, \ldots, C_i, \ldots C_M\}$, equation (1) takes the form:

$$\underset{0 \le p_{ij} \le \frac{xs}{e_{ij}}, 0 \le x_{ij} \le 1}{\max} \sum_{i,j} w_i x_{ij} \log\left(1 + \frac{p_{ij} e_{ij}}{x_{ij}}\right) \quad (2)$$

$$\text{subject to } \sum_{i,j} p_{ij} \le P, \sum_i x_{ij} \le 1 \, \forall \, j \quad (3)$$

where $p_{ij}$ is the power for the subscriber device $S_i$ in the subcarrier $C_j$, $x_{ij}$ is the fraction of $C_j$ used by $S_i$, $e_{ij}$ is the channel state or condition for $S_i$ in $C_j$. For example, $e_{ij}$ can be the normalized SINR for $S_i$ in $C_j$. Also, $s_{ij}$ is the maximum SINR for $S_i$ in $C_j$ In one embodiment of the present invention, equation (2) is solved using the method of Lagrange multipliers. Using the method of Lagrange multipliers, equation (2) reduces to:

$$\underset{\lambda \ge 0, \mu \ge 0}{\min} \underset{0 \le p \le \frac{xs}{e}, 0 \le x \le 1}{\max} L(p, x, \lambda, \mu) \quad (4)$$

where $L(p,x,\lambda,\mu)$ is the Lagrangian given by:

$$L(p, x, \lambda, \mu) = \sum_{i,j} w_i x_{ij} \log\left(1 + \frac{p_{ij} e_{ij}}{x_{ij}}\right) + \lambda\left(P - \sum_{i,j} p_{i,j}\right) + \sum_j \mu_j \left(1 - \sum_i x_{i,j}\right) \quad (5)$$

where $\lambda$ and $\mu$ are the Lagrange multipliers. Here p denotes the matrix of $p_{ij}$ for all i and j, and x, s and e are similarly defined. $\lambda$ is a first Lagrange multiplier, and $\mu$ is redefined as a subscriber metric. The subscriber metric $\mu$ is given as:

$$\mu_{ij} = w_i h(\lambda, w_i, e_{ij}, s_{ij}) \quad (6)$$

where h( ) is a computable function, $s_{ij}$ is the maximum SINR for $S_i$ in $C_j$, and $e_{ij}$ can be obtained from the channel feedback. One example of h( ) is $$h(\lambda, w, e, s) = \begin{cases} 0 & \lambda \ge we \\ \frac{\lambda}{we} - 1 - \log\left(\frac{\lambda}{we}\right) & \frac{we}{1+s} \le \lambda < we \\ \log(1+s) - \frac{\lambda}{we} s & \lambda < \frac{we}{1+s} \end{cases}$$

It can be observed from equation (6) that $\mu$ depends on the function h( ), which is a function of the dynamic weight, subscriber usage, and Signal to Interference-plus-Noise Ratio (SINR) (more generally, channel condition) of the transmission. In general, the subscriber metric is a function of at least one of the dynamic weight, subscriber usage, and/or SINR of the transmission. In equation (6), $w_i$, $e_{ij}$, and $s_{ij}$ are known. The value of h( ) can be easily computed by determining $\lambda$. In another embodiment of the present invention, an approximate value of h( ) is used.

Therefore, the function in equation (4) is optimized by determining a minimizing $\lambda$, or that value of $\lambda$ for which the function has a minimum value. In one embodiment of the present invention, this can be achieved by using standard iterative algorithms. For example, three points in the range of $\lambda$ are determined so that a middle point of the three has a lower value than the other two. The other two values are referred to as extreme points. In this way, two different intervals are obtained on either side of the middle point. The process is then repeated around the middle point in either of the intervals to converge to an optimal value of $\lambda$. The value of $\mu$ is then determined by using the value of $\lambda$. The process may also be stopped/halted after a predetermined number of iterations. In this case, an approximate or an estimate of $\lambda$ is obtained.

In an alternate embodiment of the present invention, an arbitrary value of $\lambda$ is used to estimate the value of $\mu$. For example, the value of $\lambda$ can be selected arbitrarily based on the dynamic weight and the channel feedback of the carrier channel.

Once the value of $\lambda$ and $\mu$ are obtained, these values can be used to compute the optimum values of the characteristics in the set of characteristics.

At step 308, the subcarriers are allocated to the subscriber devices based on at least one optimum value of the set of optimum values. In one embodiment of the present invention, that subcarrier is allocated to the subscriber device for which the value of the corresponding subscriber metric is maximum. For example, the subcarrier $C_j$ is allocated to the subscriber device $S_i$ when the value of $\mu_{ij}$ is maximal or highest amongst the subscriber metric values for the subcarriers $\{C_1, \ldots, C_i, \ldots C_M\}$ and the subscriber device $S_i$. For the purpose of the allocation, the subcarriers of the carrier channel 202 are grouped into a set of bundles based on the set of optimum values for each subcarrier. A bundle is then allocated to one or more subscriber devices, for example, the subscriber device 102, based on the set of optimum values for each subcarrier in the bundle. The subcarriers can be grouped into bundles by using different methods. For example, frequency hopping methods such as in Flash-OFDM can be used to group the subcarriers. Also, contiguous allocation methods such as band Advanced Modulation and Coding (band-AMC) sub-channelization in IEEE 802.16d/e can be used. Further, interleaving methods such as Fully Used Sub-Channelization (FUSC) and Partially Used Sub-Channelization (PUSC) in IEEE 802.16d/e can be used. In addition, other subchannelizations from IEEE 802.16d/e like O-PUSC (Optional-PUSC), TUSC (Tile used Sub-channelization), or O-TUSC (Optional-TUSC) may also be used.

Once the subcarriers are allocated to the subscriber devices, an optimal power is allocated to the subcarriers. For example, the power $p_{ij}$ is determined and allocated to the subcarrier $C_j$ for the transmission of $S_i$.

For the OFDMA uplink, for which the carrier channel includes, for example, M subcarriers represented by $\{C_1, \ldots, C_i, \ldots C_M\}$, equation (1) takes the form:

$$\max_{0 \le p_{ij} \le \frac{x_{ij} s_{ij}}{e_{ij}}, 0 \le x_{ij} \le 1} \sum_{i,j} w_i x_{ij} \log\left(1 + \frac{p_{ij} e_{ij}}{x_{ij}}\right) \quad (7)$$

$$\text{subject to} \sum_j p_{ij} \le P_i \, \forall \, i, \sum_i x_{ij} \le 1 \, \forall \, j$$

where $p_{ij}$ is the power for the subscriber device $S_i$ in the subcarrier $C_j$, $P_i$ is the maximum power that subscriber device $S_i$ can use, $x_{ij}$ is the fraction of $C_j$ used by $S_i$, $e_{ij}$ is the channel state or condition for $S_i$ in $C_j$. For example, $e_{ij}$ can be the normalized SINR for $S_i$ in $C_j$. Also, $s_{ij}$ is the maximum SINR for $S_i$ in $C_j$.

In one embodiment of the present invention, equation (7) is solved using the method of Lagrange multipliers. Using the method of Lagrange multipliers, equation (2) reduces to:

$$\min_{\lambda \ge 0, \mu \ge 0} \max_{0 \le p \le \frac{xs}{e}, 0 \le x \le 1} L1(p, x, \lambda, \mu)$$

where $L1(p,x,\lambda,\mu)$ is the Lagrangian given by:

$$L1(p, x, \lambda, \mu) =$$

$$\sum_{i,j} w_i x_{ij} \log\left(1 + \frac{p_{ij} e_{ij}}{x_{ij}}\right) + \sum_i \lambda_i \left(P_i - \sum_j p_{i,j}\right) + \sum_j \mu_j \left(1 - \sum_i x_{i,j}\right)$$

where $\lambda$ and $\mu$ are the Lagrange multipliers. $\lambda$ is a first Lagrange multiplier that is concerned with the power constraint at the transmitter of the subscriber unit, and $\mu$ is redefined as a subscriber metric. The subscriber metric $\mu$ is given as:

$$\mu_{ij} = w_i h(\lambda_i, w_i, e_{ij}, s_{ij})$$

where h( ) is a computable function, and $s_{ij}$ is the maximum SINR for $S_i$ in $C_j$. $e_{ij}$ can be obtained from measurements made the base-station. For TDD systems, the feedback from the subscriber can also be used, owing to reciprocity of the channels.

Figure 4:
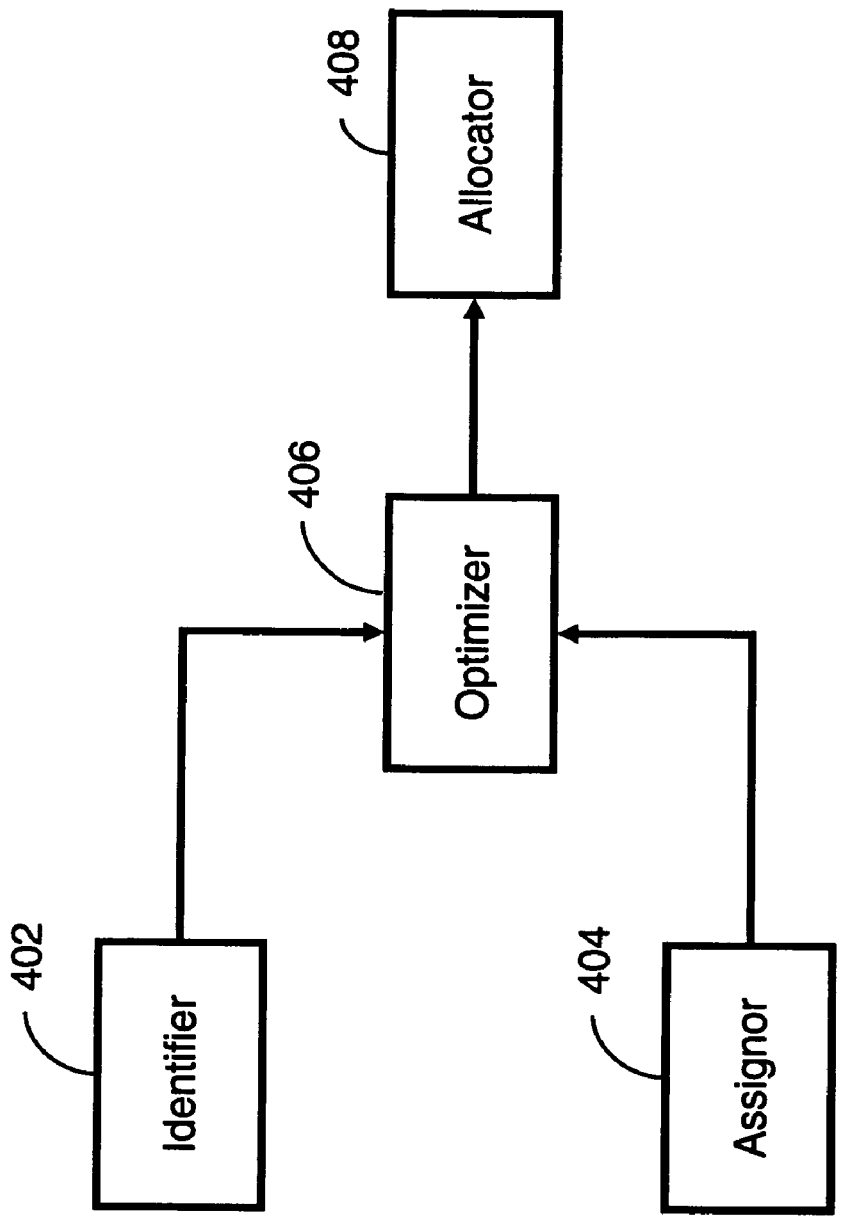
FIG. 4 is a block diagram illustrating a system in a base station that is suitable for allocating subcarriers to subscriber devices in a wireless network, in accordance with another embodiment of the present invention.

FIG. 4 shows a block diagram illustrating a system in the BS 106 suitable for allocating the subcarriers to the subscriber devices in the wireless network, in accordance with an embodiment of the present invention. The system includes an identifier 402, an assignor 404, an optimizer 406, and an allocator 408. The identifier 402 identifies the set of characteristics for the transmission on each subcarrier of the subcarriers of the carrier channel. The assignor 404 assigns the dynamic weight to the subscriber devices, for example, subscriber devices 102 and 104 at each decision instance of the transmission corresponding to the subscriber devices. The assignment of the dynamic weight is based on at least one of the throughput, delay, packet-loss, or queue length requirements of the flows of the subscriber devices. The optimizer 406 is capable of determining the set of optimum values for the set of characteristics based on the dynamic weight and the channel feedback. The set of optimum values are determined under the set of constraints for each subcarrier of the carrier channel. Based on the optimum values of the set of optimum values, the allocator 408 groups the subcarriers into the bundles to allocate the subcarriers to the subscriber devices.

Embodiments of the present invention have the advantage that they easily accommodate different bundling or grouping methods such as frequency hopping and interleaving, along with channel quality feedback and additional constraints. The dynamic weights based on the QoS requirements allow for an equitable distribution of the subcarriers in the carrier channel, and therefore, an equitable throughput distribution among the subscriber devices. Hence, embodiments of the present invention satisfy the QoS requirements in spite of the carrier channel conditions and constraints.

It will be appreciated that the modules described herein may be comprised of one or more conventional processors and unique stored program instructions that control the one or more processors to implement, in conjunction with certain non-processor circuits, some, most, or all of the functions of the modules described herein. The non-processor circuits may include, but are not limited to, a radio receiver, a radio transmitter, signal drivers, clock circuits, power source circuits, and user input devices. As such, these functions may be interpreted as steps of a method to perform {allocating a plurality of subcarriers to a plurality of subscriber devices}. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method for allocating a plurality of subcarriers to a plurality of subscriber devices in a wireless network, the method comprising:

identifying a power for a transmission on each subcarrier of the plurality of subcarriers;

assigning a dynamic weight to at least one subscriber device of the plurality of subscriber devices at each decision instance of the transmission corresponding to the at least subscriber device, wherein the assignment of the dynamic weight is based on queue length requirements of one or more flows of the at least one subscriber device;

determining a set of optimum values for the power based on the dynamic weight, wherein the set of optimum values are determined under a set of constraints for each subcarrier of the plurality of subcarriers, and comprising optimizing a rate vector $V_t$, of the form $$V_t = \arg\max_{v \in R(\eta_t)} \sum_i w_i v_i$$

where $\eta_t$ represents the collective (of all users) channel state at time t, $R(\eta_t)$ is the rate region at time t, $v_i$ is a rate for the subscriber device $S_i$ and $w_i$, is the dynamic weight assigned to $v_i$; and allocating at least one subcarrier of the plurality of subcarriers to at least one subscriber device based on at least one optimum value of the set of optimum values.

2. The method according to claim 1 further comprising allocating an optimal power to at least one subcarrier.

3. The method according to claim 1 wherein the set of constraints for each subcarrier of the plurality of subcarriers is at least one from a group comprising uplink constraints, downlink constraints, and subscriber device constraints.

4. The method according to claim 1 wherein the dynamic weight is a collective dynamic weight of different dynamic weights for each flow from the at least one subscriber device.

5. The method according to claim 1 wherein for an OFDMA downlink the rate vector for which the carrier channel includes M subcarriers represented by $\{C_1, \ldots, C_i, \ldots C_M\}$ takes the form $$\max_{0 \le p_{ij} \le \frac{x_{ij} s_{ij}}{e_{ij}}, 0 \le x_{ij} \le 1} \sum_{i,j} w_i x_{ij} \log\left(1 + \frac{p_{ij} e_{ij}}{x_{ij}}\right) \text{ subject to } \sum_{i,j} p_{ij} \le P,$$

$$\sum_i x_{ij} \le 1 \forall j$$

where $P_{ij}$ is the power for the subscriber device $S_i$ in the subcarrier $C_j$, $x_{ij}$ is the fraction of $C_j$ used by $S_i$, $e_{ij}$ is the channel state or condition for $S_i$ in $C_j$. For example, $e_{ij}$ can be the normalized SINR for $S_i$ in $C_j$. Also, $s_{ij}$ is the maximum SINR for $S_i$ in $C_j$.

6. The method according to claim 5 wherein the rate vector is optimized using one or more Lagrange multipliers comprising a first Lagrange multiplier and a subscriber metric for each subcarrier of the plurality of subcarriers, where reduces to $$\max_{0 \le p_{ij} \le \frac{x_{ij} s_{ij}}{e_{ij}}, 0 \le x_{ij} \le 1} \sum_{i,j} w_i x_{ij} \log\left(1 + \frac{p_{ij} e_{ij}}{x_{ij}}\right) \min_{\lambda \ge 0, \mu \ge 0} \max_{0 \le p \le \frac{xs}{e}, 0 \le x \le 1} L(p, x, \lambda, \mu)$$

where $L(p,x,\lambda,\mu)$ is the Lagrangian given by $$L(p, x, \lambda, \mu) = \sum_{i,j} w_i x_{ij} \log\left(1 + \frac{p_{ij} e_{ij}}{x_{ij}}\right) + \lambda\left(P - \sum_{i,j} p_{i,j}\right) + \sum_j \mu_j\left(1 - \sum_i x_{i,j}\right)$$

where $\lambda$ and $\mu$ are the Lagrange multipliers. Here p denotes the matrix of $p_{ij}$ for all i and j, and x, s and e are similarly defined. $\lambda$ is a first Lagrange multiplier, and $\mu$ is redefined as a subscriber metric $\mu$ is given as $$\mu_{ij} = w_i h(\lambda, w_i, e_{ij}, s_{ij})$$

where h( ) is a computable function, $s_{ij}$ is the maximum SINR for $S_i$ in $C_j$, and $e_{ij}$ is obtained from channel feedback.

7. The method according to claim 6 wherein the subscriber metric is estimated by determining a minimum value of the first Lagrange multiplier.

8. The method according to claim 6 wherein the subscriber metric is estimated by using an arbitrary value of the first Lagrange multiplier.

9. The method according to claim 8 wherein the arbitrary value is based on the dynamic weight, and at least one set of constraints from the group consisting of uplink constraints and downlink constraints.

10. The method according to claim 6 wherein the subscriber metric is a function of at least one from a group comprising the dynamic weight, subcarrier usage, and signal to interference-plus-noise ratio (SINR) of the transmission.

11. The method according to claim 1 wherein allocating the at least one subcarrier of the plurality of subcarriers to the at least one subscriber device comprises allocating that subcarrier to the subscriber device for which a subscriber metric is maximum.

12. The method according to claim 1 wherein the transmission is directed from at least one subscriber device to a base station.

13. The method according to claim 1 wherein the transmission is directed from a base station to at least one subscriber device.

14. The method according to claim 1 wherein the at least one subcarrier is allocated to at least one subscriber device using interleaving.

15. The method according to claim 1 wherein the at least one subcarrier is allocated to at least one subscriber device using frequency-hopping.

16. The method according to claim 1 wherein a contiguous allocation is performed to allocate at least one subcarrier to the at least one subscriber device.

17. A method for optimizing subcarrier allocation for a plurality of subscriber devices in a wireless network, the method comprising:

identifying a power for transmissions on a plurality of subcarriers;

assigning a dynamic weight to one or more subscriber devices of the plurality of subscriber devices at each decision instance of a transmission corresponding to the one or more subscriber devices, wherein assignment of the dynamic weight is based on queue length requirements of one or more flows of the one or more subscriber devices;

determining a set of optimum values of the power for each subcarrier of the plurality of subcarriers based on the dynamic weight, wherein the set of optimum values are determined under a set of constraints for each subcarrier of the plurality of subcarriers, and comprising optimizing a rate vector $V_t$, of the form $$V_t = \arg\max_{v \in R(\eta_t)} \sum_i w_i v_i$$

where $\eta_t$ represents the collective (of all users) channel state at time t, $R(\eta_t)$ is the rate region at time t, $v_i$ is a rate for the subscriber device $S_i$, and $w_i$ is the dynamic weight assigned to $v_i$;

grouping subcarriers of the plurality of subcarriers into a set of bundles based on the set of optimum values for each subcarrier of the plurality of subcarriers; and allocating a bundle of the set of bundles to the one or more subscriber devices based on the set of optimum values for each subcarrier in the bundle.

18. The method according to claim 17 wherein grouping the subcarriers of the plurality of subcarriers into the set of bundles comprises grouping the subcarriers using at least one from a group comprising contiguous allocation, frequency hopping, and interleaving.

19. A system in a base station suitable for allocating a plurality of subcarriers to a plurality of subscriber devices in a wireless network, the system comprising:

an identifier capable of identifying a power for a transmission on each subcarrier of the plurality of subcarriers;

an assignor for assigning a dynamic weight to at least one subscriber device of the plurality of subscriber devices at each decision instance of the transmission corresponding to the at least one subscriber device, wherein assignment of the dynamic weight is based on queue length requirements of one or more flows of the at least one subscriber device;

an optimizer capable of determining a set of optimum values for the power based on the dynamic weight, wherein the set of optimum values are determined under a set of constraints for each subcarrier of the plurality of subcarriers, and comprising optimizing a rate vector $V_t$, of the form $$V_t = \arg\max_{v \in R(\eta_t)} \sum_i w_i v_i$$

where $\eta_t$ represents the collective (of all users) channel state at time t, $R(\eta_t)$ is the rate region at time t, $v_i$ is a rate for the subscriber device $S_i$, and $w_i$ is the dynamic weight assigned to $v_i$; and an allocator capable of allocating at least one subcarrier of the plurality of subcarriers to at least one subscriber device based on at least one optimum value of the set of optimum values.

\* \* \* \* \*